(12) United States Patent
Erker

(10) Patent No.: US 7,108,322 B2
(45) Date of Patent: Sep. 19, 2006

(54) MECHANISM FOR CHANGING A POSITION OF A SUPPORT SURFACE

(75) Inventor: Christian Erker, Zitzergasse 21, D-61250 Usinger (DE)

(73) Assignees: Christian Erker, Usinger (DE); Grammer AG, Amberg (DE)

( * ) Notice: Subject to any disclaimer, the term of this patent is extended or adjusted under 35 U.S.C. 154(b) by 0 days.

(21) Appl. No.: 10/408,688

(22) Filed: Apr. 7, 2003

(65) Prior Publication Data

US 2003/0189366 A1 Oct. 9, 2003

(30) Foreign Application Priority Data

Apr. 7, 2002 (DE) .................. 102 15 286

(51) Int. Cl.
*A47C 7/14* (2006.01)
(52) U.S. Cl. ................... 297/284.11; 297/423.2
(58) Field of Classification Search .......... 297/284.11, 297/284.2, 337, 423.19, 423.2
See application file for complete search history.

(56) References Cited

U.S. PATENT DOCUMENTS

| 3,007,738 | A | * | 11/1961 | Gardel et al. | 297/423.2 |
|---|---|---|---|---|---|
| 4,334,709 | A | * | 6/1982 | Akiyama et al. | 297/284.11 |
| 4,350,389 | A | * | 9/1982 | Parsson et al. | 297/410 |
| 4,773,703 | A | * | 9/1988 | Krugener et al. | 297/284.1 |
| 4,915,444 | A | * | 4/1990 | Rogers, Jr. | 297/68 |
| 5,171,062 | A | * | 12/1992 | Courtois | 297/340 |
| 5,312,161 | A | * | 5/1994 | Mars | 297/423.2 |
| 5,513,897 | A | * | 5/1996 | Lemmen | 297/410 |
| 5,556,157 | A | * | 9/1996 | Wempe | 297/68 |
| 5,588,708 | A | * | 12/1996 | Rykken et al. | 297/423.2 |
| 6,095,610 | A | * | 8/2000 | Okajima et al. | 297/423.36 |
| 6,106,063 | A | * | 8/2000 | Dauphin | 297/284.11 |
| 6,375,261 | B1 | * | 4/2002 | Link | 297/284.11 |
| 6,454,353 | B1 | * | 9/2002 | Knaus | 297/284.11 |
| 6,601,918 | B1 | * | 8/2003 | Mattsson | 297/284.11 |

FOREIGN PATENT DOCUMENTS

| CN | 2481215 | | 3/2002 |
|---|---|---|---|
| EP | 1163866 | | 12/2001 |
| GB | 2252723 | A * | 8/1992 |
| GB | 2292518 | A * | 2/1996 |

* cited by examiner

*Primary Examiner*—Peter M. Cuomo
*Assistant Examiner*—Joseph Edell
(74) *Attorney, Agent, or Firm*—Abelman, Frayne & Schwab

(57) ABSTRACT

A mechanism for changing a position of a support surface (3) for seats and couches and a length of which changes in a longitudinal direction, includes two horizontally spaced, telescopic rods (1) having each a bent region and displaceable in two telescopic sleeves (2), and two slide connection elements carrying a deformable region (22) of the support surface (3) and surrounding respective telescopic rods (1).

3 Claims, 12 Drawing Sheets

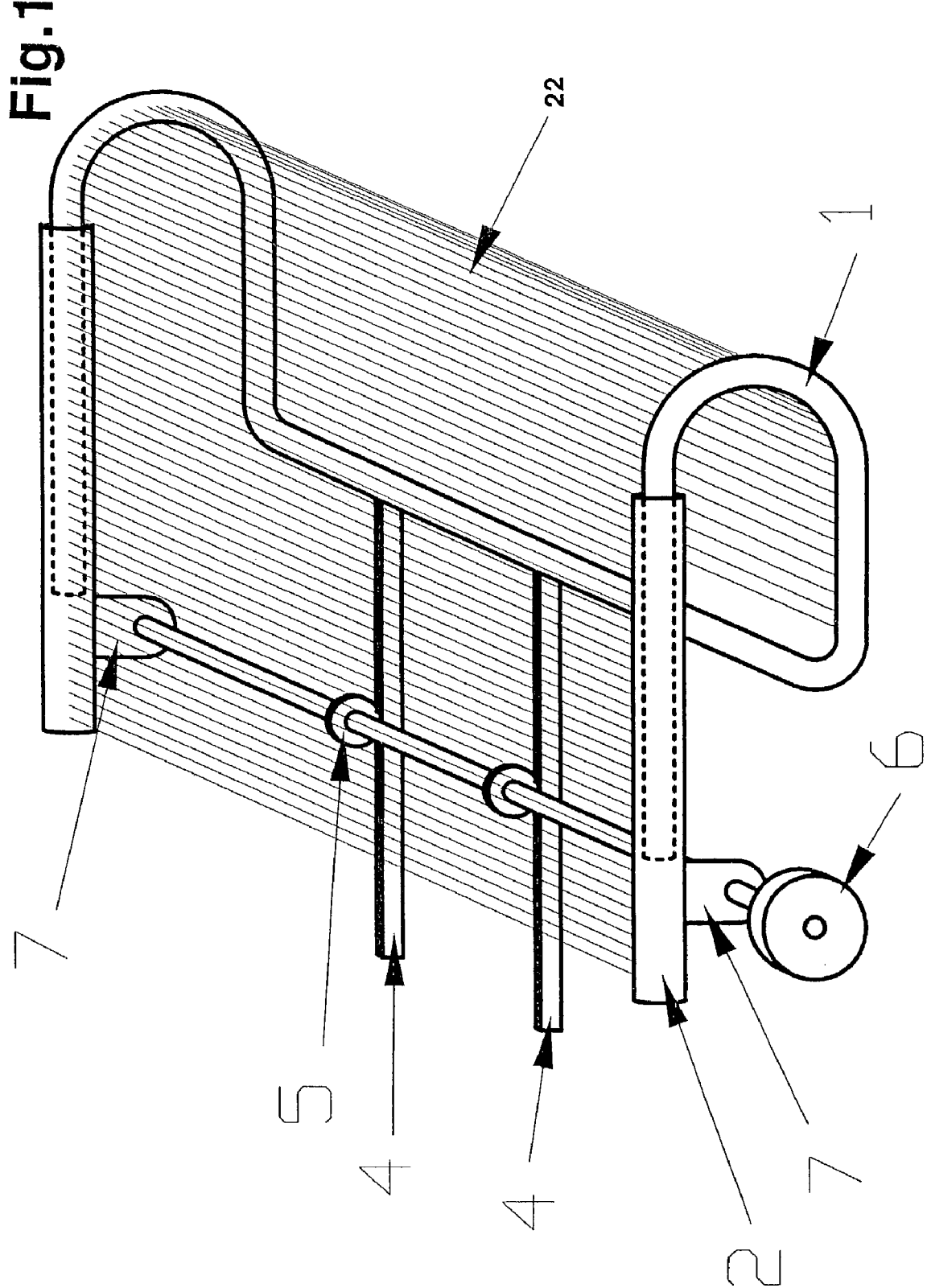

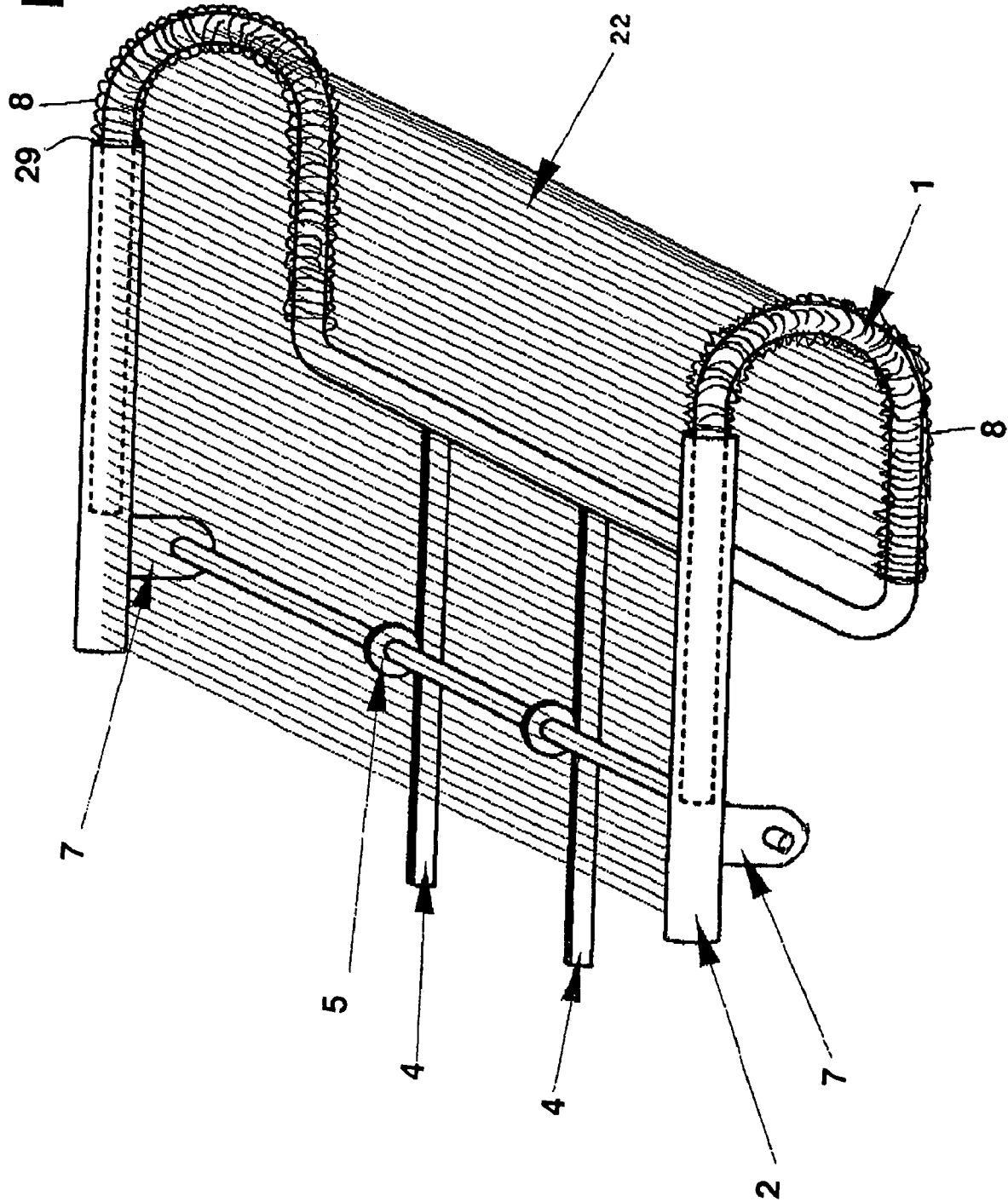

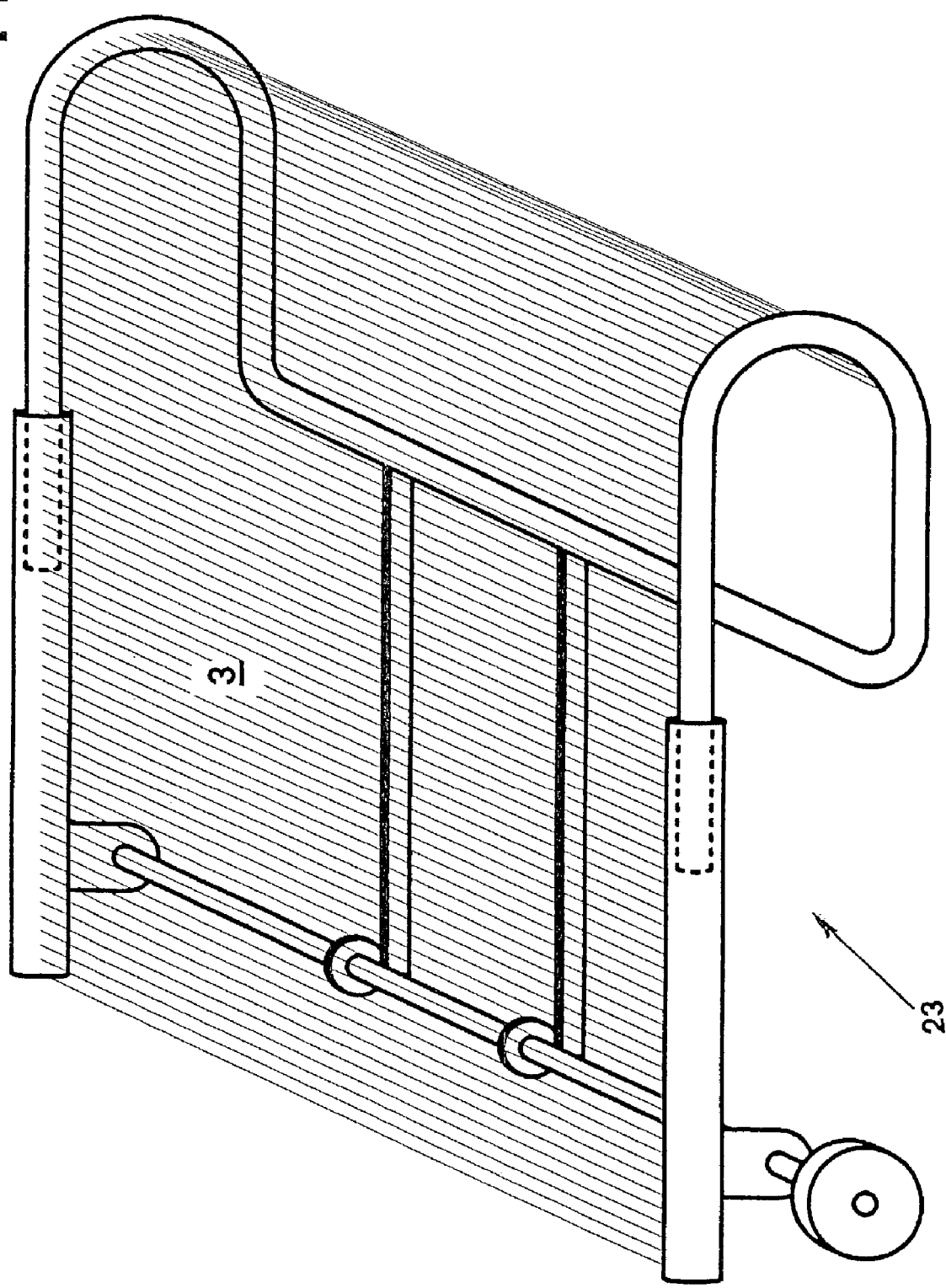

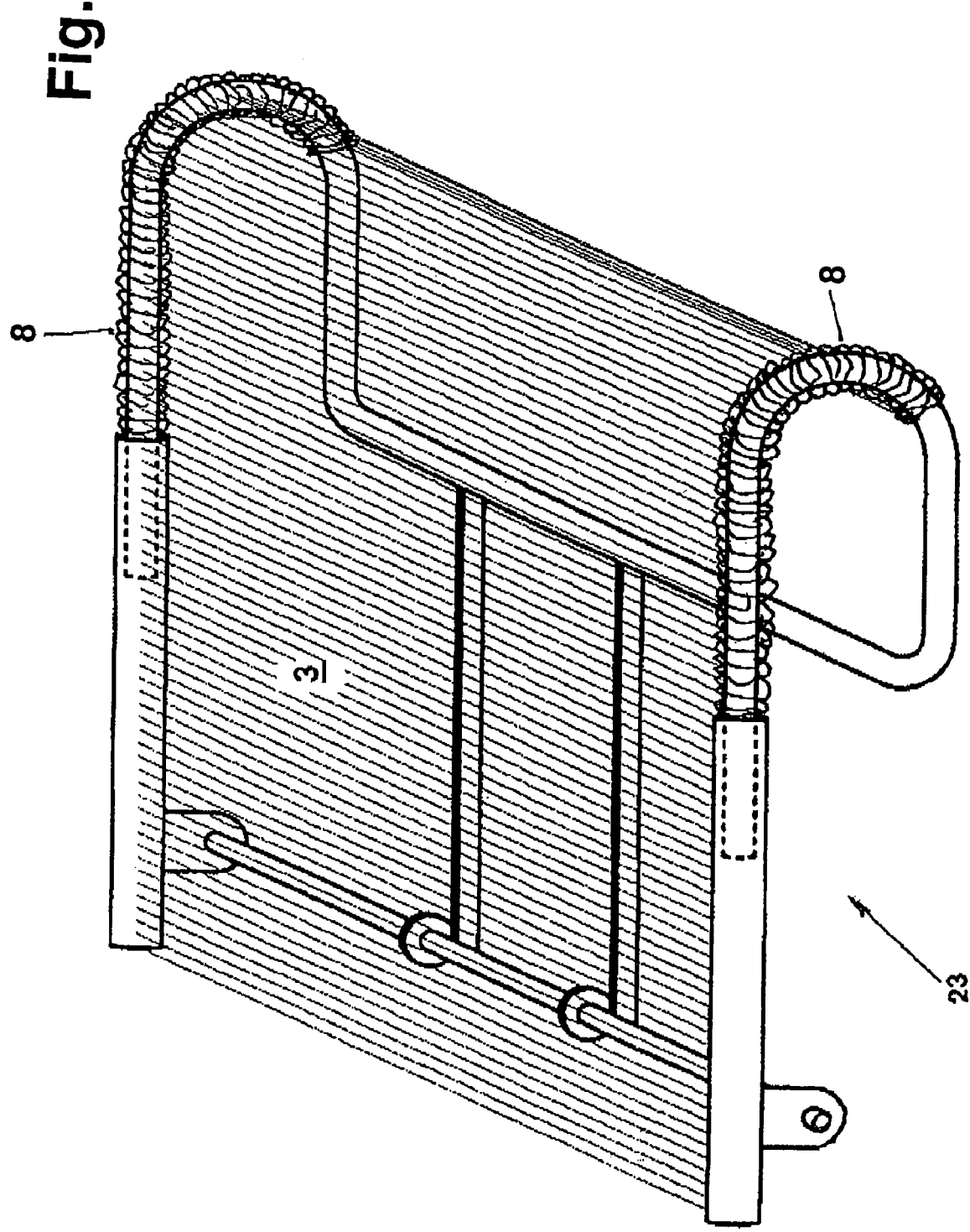

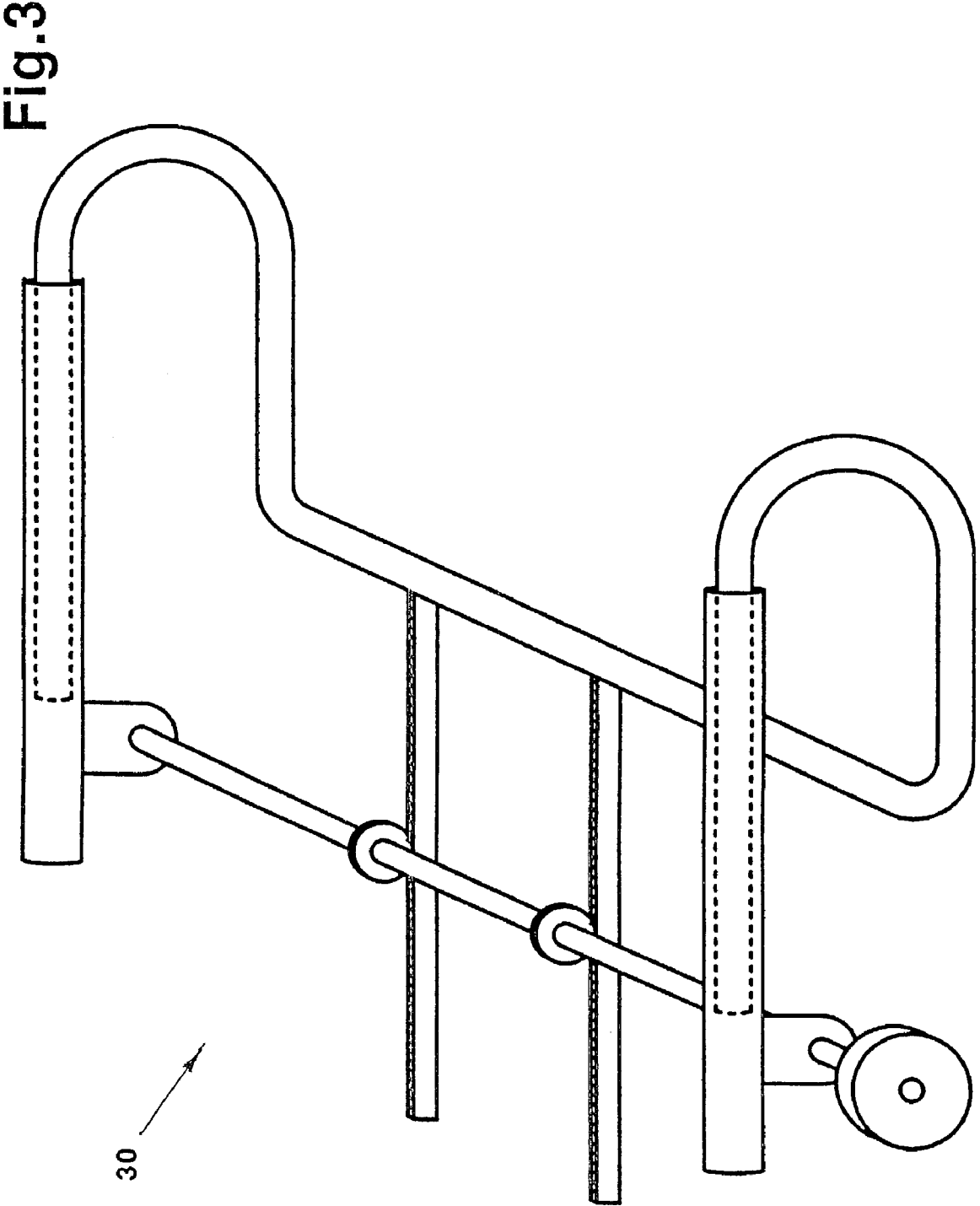

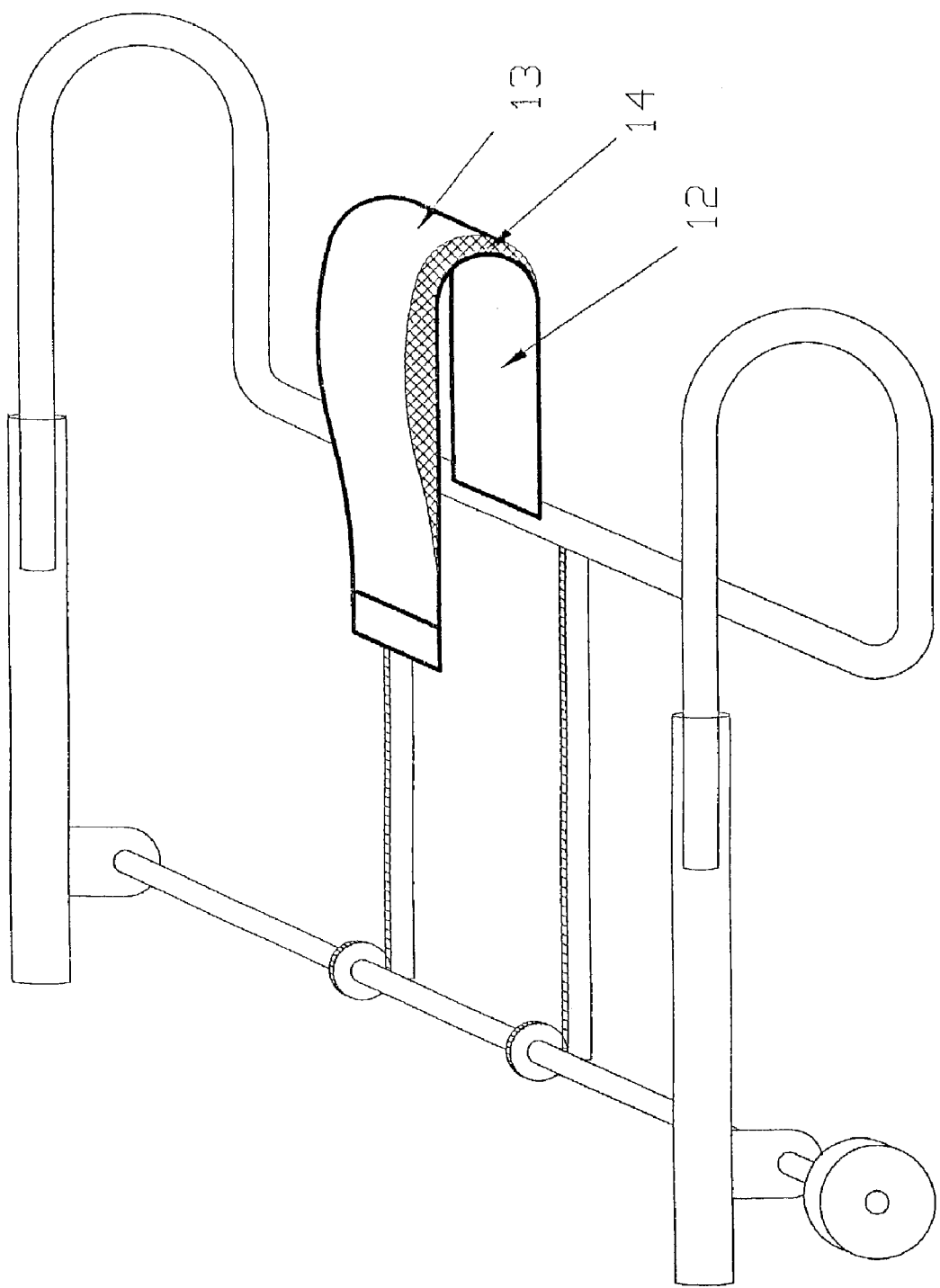

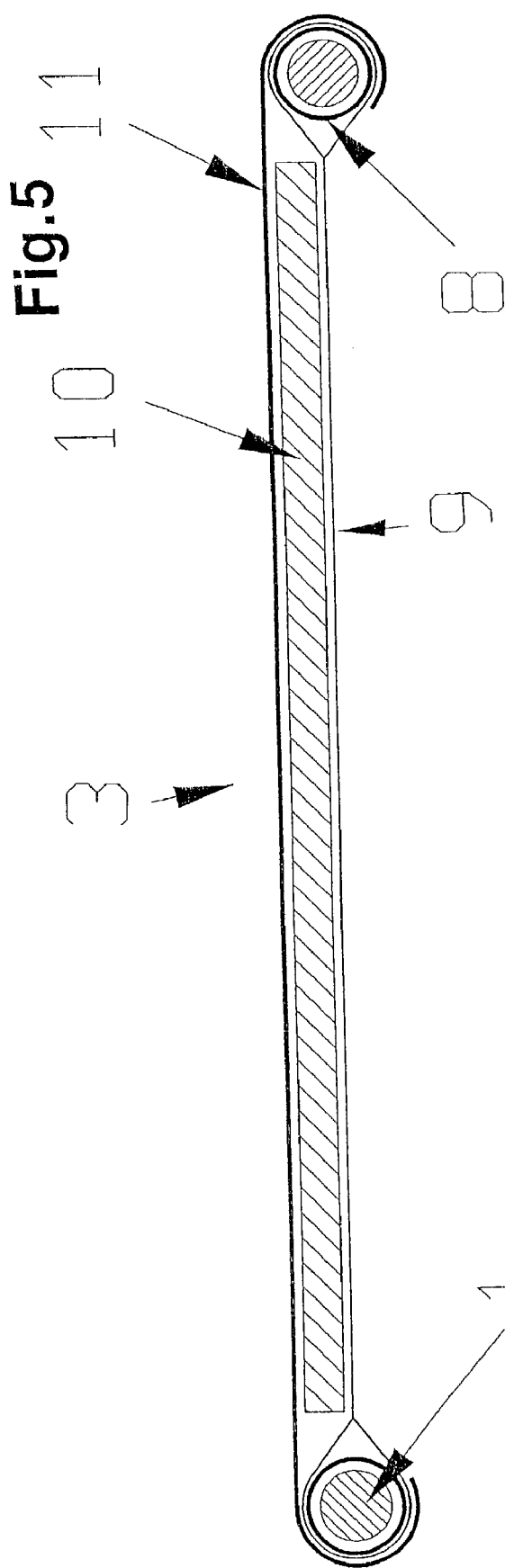
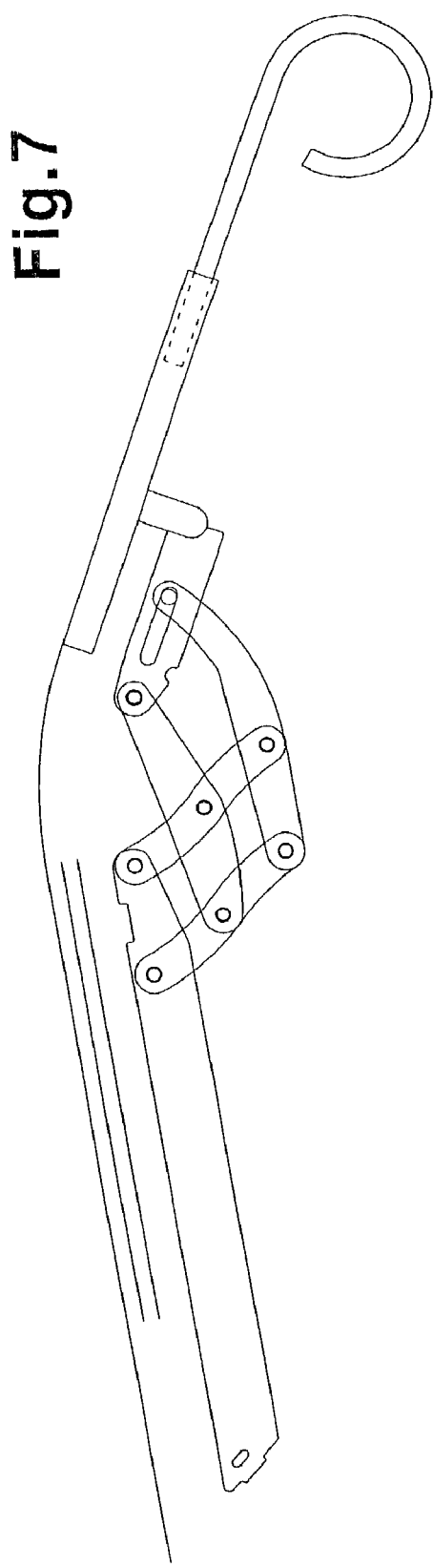

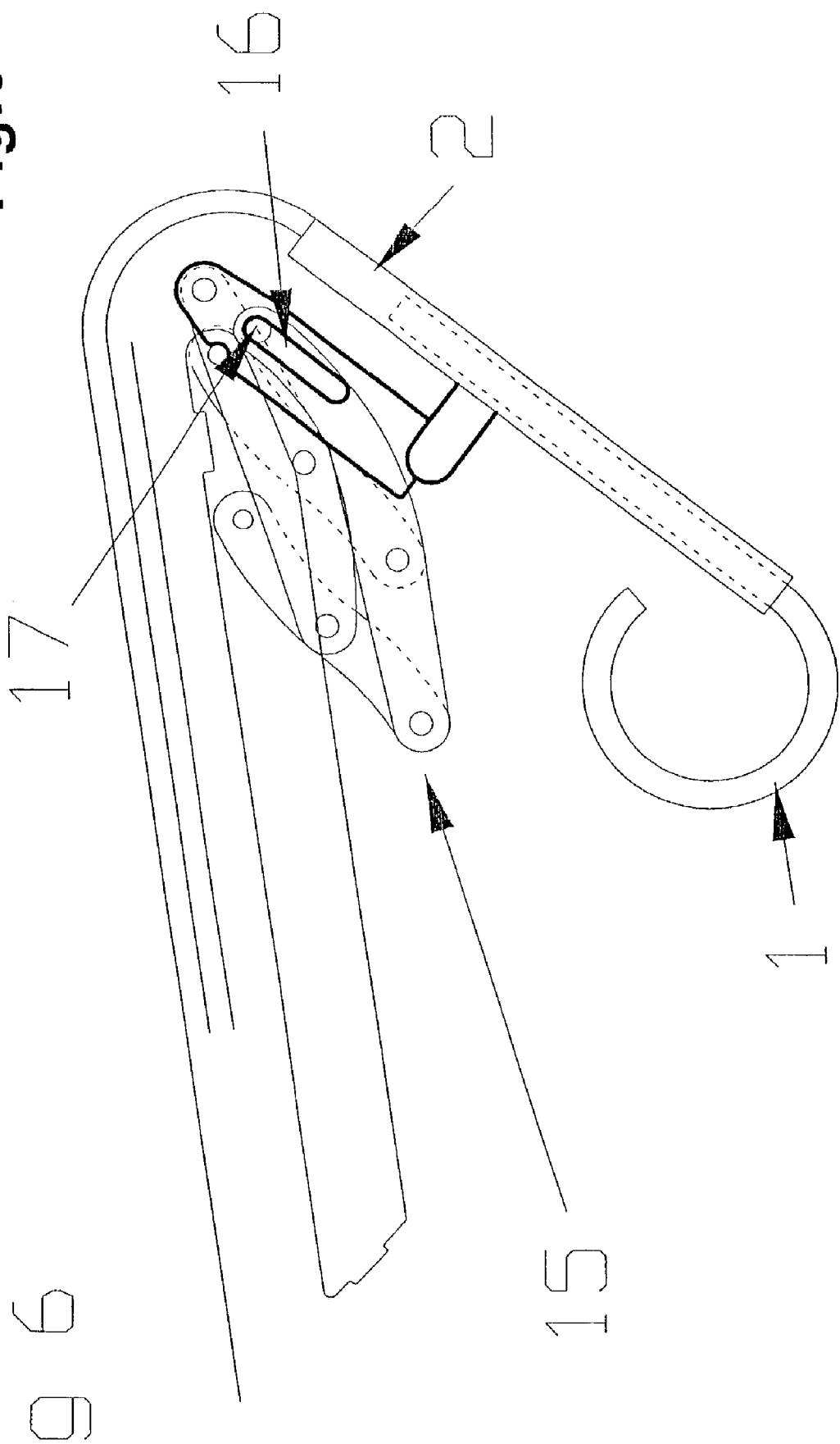

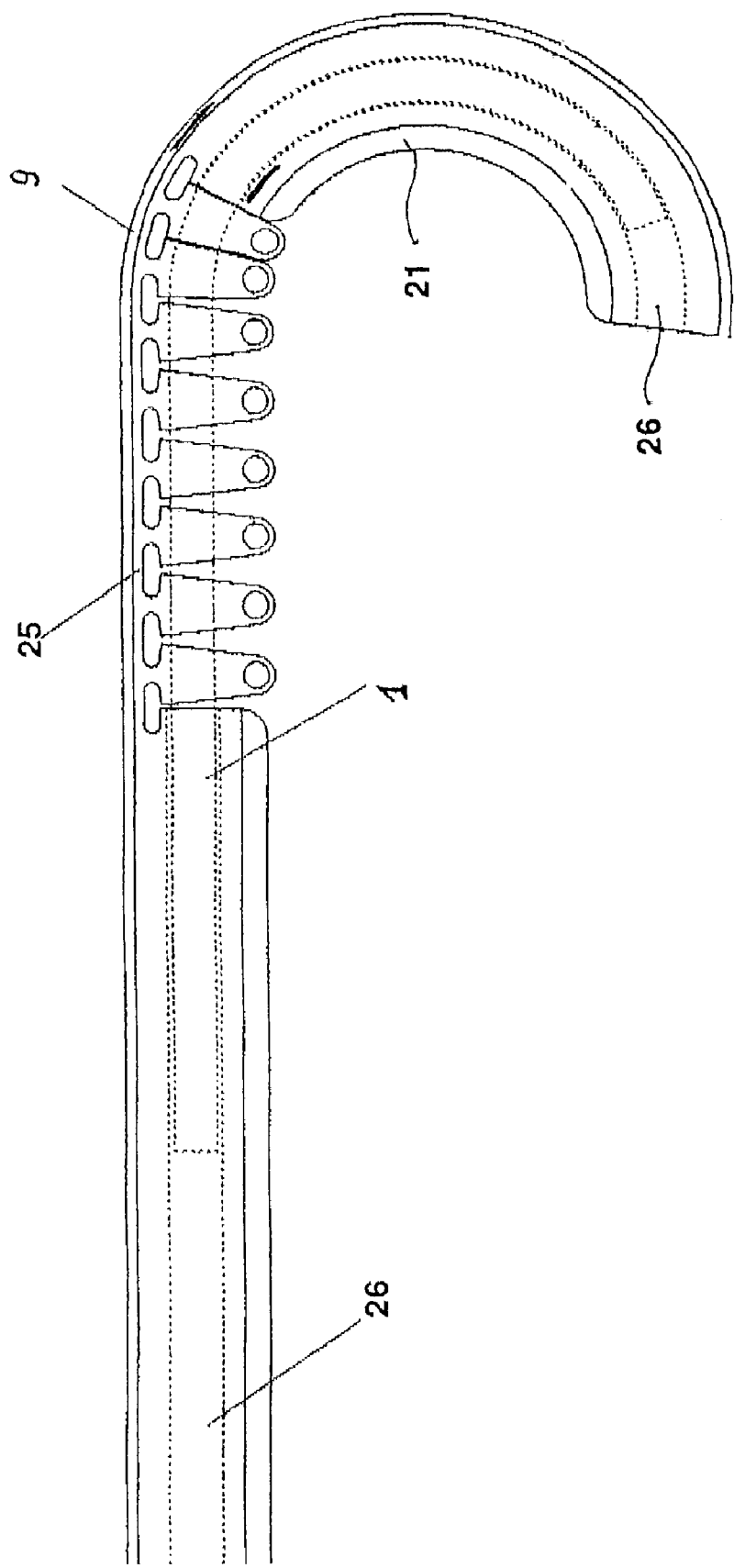

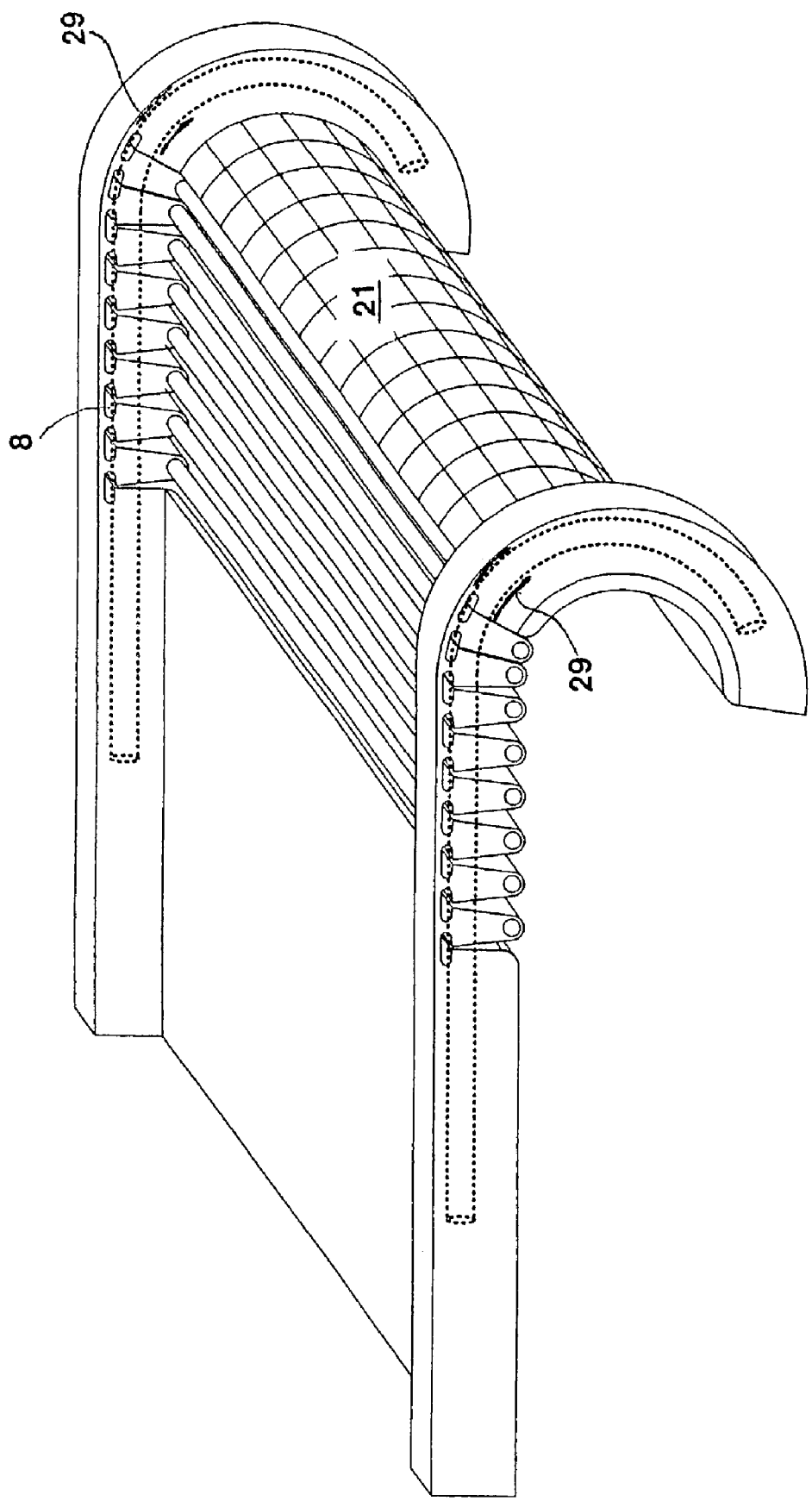

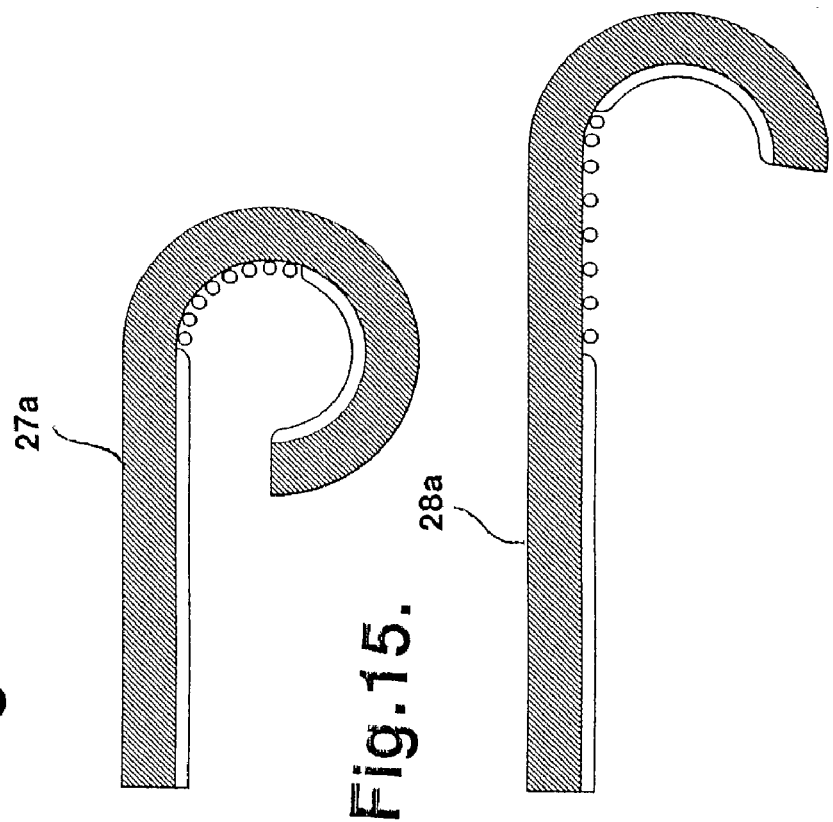
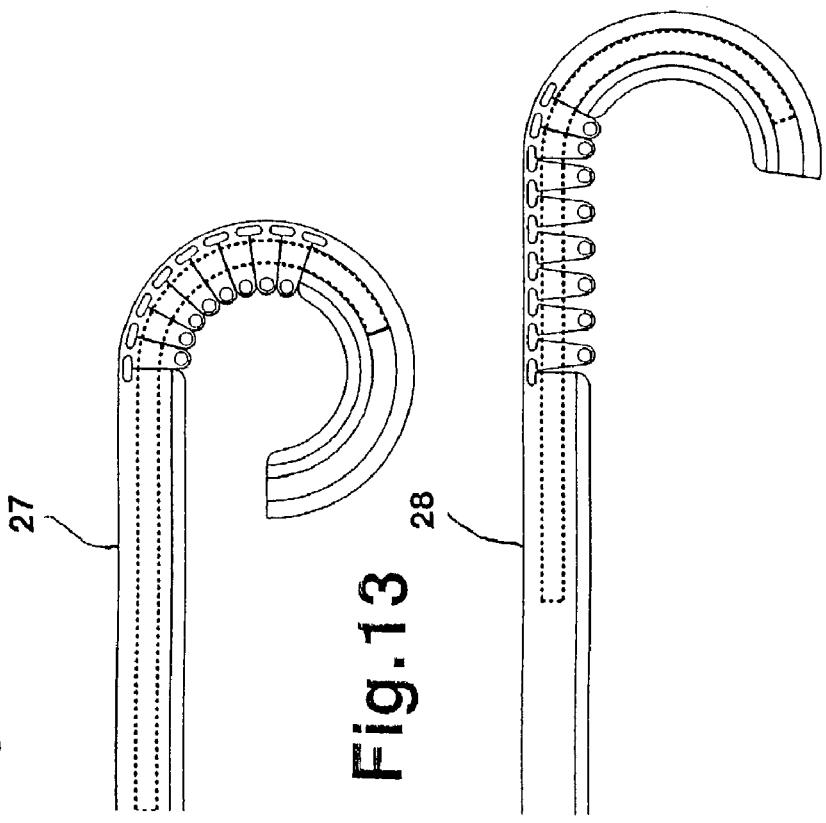

… (1)
MECHANISM FOR CHANGING A POSITION OF A SUPPORT SURFACE

BACKGROUND OF THE INVENTION

1. Field of the Invention

The present invention relates to a mechanism for changing a length or position of a support surface of seats and/or couches.

2. Description of the Prior Art

Modern, mass-produced upholstery furniture pieces such as seats and/or couches have backrests with a constant height. Therefore, they do not provide an appropriate support for short persons. For tall persons, the height of the seat backrests often is too short. The leg support for tall persons is also inadequate, and a tall person cannot properly bend his/her legs because a short distance between the seat and a floor surface.

Accordingly, an object of the present invention is a mechanism for changing the position of the support surface(s), e.g., of the seating surface, in such a way that the position of at least one of associated support surfaces, which are smoothly combined with each other, can be easily arbitrary changed.

SUMMARY OF THE INVENTION

This and other objects of the present invention, which will become apparent hereinafter, are achieved by providing a mechanism for changing a position of a support surface for seats and couches and a length of which changes in a longitudinal direction, and including two horizontally spaced from each other, telescopic rods having each a bent region, two slide connection elements surrounding the two telescopic rods and carrying a deformable region of the support surface, and two telescopic sleeves in which the two telescopic rods are telescopically displaceable. The mechanism permits to arbitrary change the position of a respective support surface, which permits to accommodate it for a person with a different height.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a perspective view of a support surface in a retracted condition;

FIG. 1*a*, a view similar to that of FIG. 1 but with sliding elements surrounding the telescopic rods;

FIG. 2 a perspective view of a support surface in a pull-out condition;

FIG. 2*a*, a view similar to that of FIG. 1 but with sliding elements surrounding the telescopic rods.

FIG. 3 a perspective view of a support frame for the support surface;

FIG. 4 a perspective view of the support frame shown in FIG. 3 for relaxation of thigh muscles;

FIG. 5 a cross-sectional view of telescopic rods and the support surface;

FIG. 6 a side view of a folding mechanism;

FIG. 7 a side view of the folding mechanism shown in FIG. 6 in its extended position;

FIG. 10 a schematic view of a bending zone of another embodiment of the displacement mechanism;

FIG. 11 a perspective view of a deformable region of the support surface;

FIG. 12 a perspective view of a telescopic leg with a portion of the retracted support surface;

FIG. 13 a perspective view of a telescopic leg with a portion of the pull-out support surface;

FIG. 14 a view showing the telescopic leg shown in FIG. 12 with a covering; and FIG. 15 a view showing the telescopic leg shown in FIG. 13 with a covering.

DETAILED DESCRIPTION OF THE PREFERRED EMBODIMENTS

Figure 9:
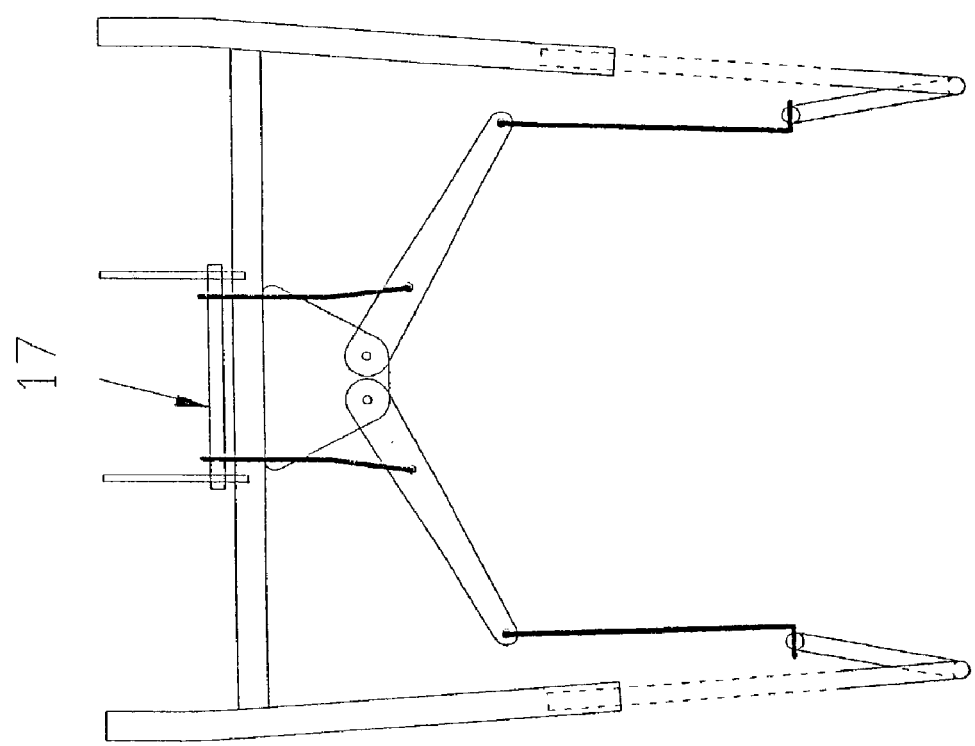
FIG. 9 a schematic view of the telescopic arrangement in its pull-out position.

FIG. 1 shows a deformable region 22 of the support surface 3 in the retracted position of the support surface 3. In the position shown in FIG. 1, telescopic rods 1 of the telescopic mechanism are completely inserted in telescopic sleeves 2 provided in the frame of the telescopic mechanism. The support surface 3 is displaced into its retracted position to accommodate a short person. The displacement of the telescopic rods 1, together with the support surface 3 secured thereto, is effected by a height controlling mechanism including tooth bars 4 which are attached to the support surface 3, and tooth gears 5 which cooperate with respective bars 4 and which are supported on a common shaft supported in brackets 7 secured to respective sleeves 2. The displacement of the support surface 3 is effected manually with a hand wheel 6. The support surface 3 can be displaced in any position between the completely retracted position shown in FIG. 1, and a completely pull-out position shown in FIG. 2 in which the deformable region is completely expanded as shown with a reference numeral 23.

FIGS. 1*a* and 2*a* show, respectively, views similar to those of FIGS. 1 and 2 and showing telescopic rods of the telescopic mechanism being surrounded by sliding elements 8 which are secured to respective telescopic sleeves 2 by brackets 29, as shown in FIG. 1*a*. As further shown in FIG. 1*a*, the sliding elements 8 almost completely surround the telescopic rods 1 in the retracted position of the deformable region 22 of the support surface 3. However, the sliding elements 8, as shown in FIG. 2*a*, only partially surround the telescopic rods in the pull-out position of the deformable region 22 of the support surface 3.

FIG. 3 shows the support frame 30 for the support surface 3, together with the height controlling mechanism.

FIG. 4 shows the support frame 30 shown in FIG. 3 but with means for relaxation of thigh muscles. The relaxation means includes a support 12 and a resilient strip 14 mounted on the support 12 and having a smooth surface 13.

FIG. 5 shows a cross-sectional view of the telescopic rods 1 and the support surface 3 which is attached to the slide connection elements 8 surrounding the telescopic rods 1 and secured thereto. Means 9 provides for stretching of the support surface 3. The reference manual 9 represent a back cover which can be more elastic or less elastic. The support surface can be formed of upholstery 10 of textile or foam material which is covered by a covering 11.

FIG. 6 shows a folding mechanism 15 which controls the position of the telescopic sleeve 2. The telescopic sleeve 2 is retained in its predetermined position by an axle bolt 17 displaceable in a slot 16.

FIG. 7 shows the position of the folding mechanism 15 in a maximum extended position of the sleeve 2.

Figure 8:
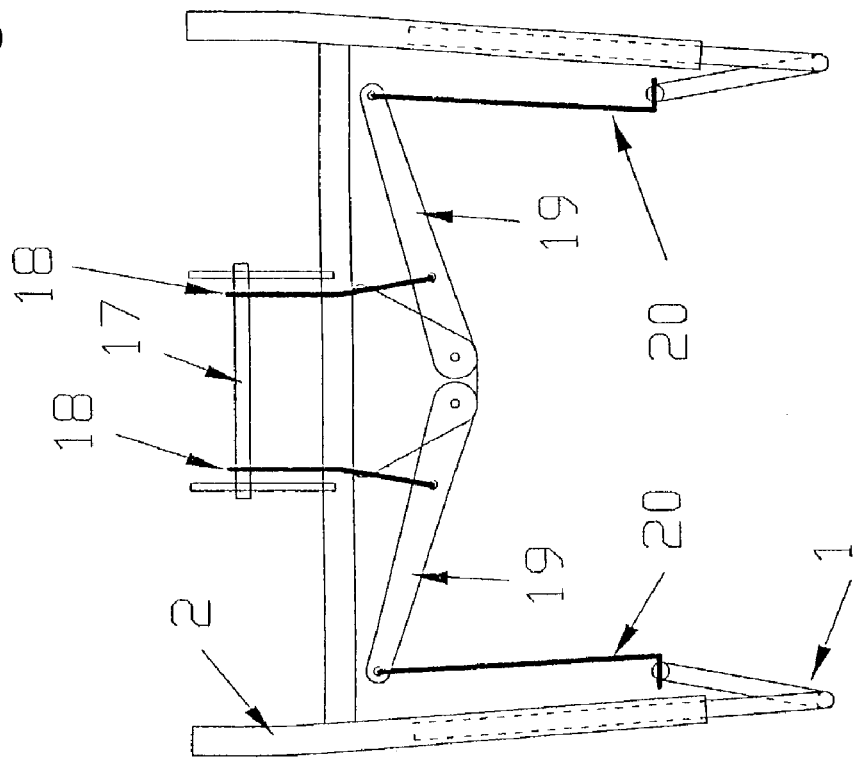
FIG. 8 a schematic view of the telescopic arrangement in its retracted position.

FIGS. 8 and 9 show the mechanism for displacing the telescopic rods 1 between their retracted (FIG. 8) and pull-out (FIG. 9) positions which correspond, respectively, to folded and extended positions of the telescopic sleeves 2 which are determined by positions of the axle bolt 17 in the slot 16. The axle bolt 17 is displaced by displacement bars 18 which is displaced by a lever mechanism including two levers 19. The free ends of the levers 19 are connected with the telescopic rods 1 by displacement bars 20. Upon appropriate actuation of the lever mechanism, the telescopic sleeves 2 and the telescopic rods II are displaced from the retracted position shown in FIG. 8 to the pull-out position shown in FIG. 9.

FIG. 10 shows an end element 21 with which a synchronized displacement of the telescopic rods 1 is achieved. The end element 21 is attached to a region 25 of the support surface 3 the length of which does not change during displacement of telescopic rods 1 between the retraced and pullout positions. With the constant length region 25, a height-controlling mechanism for displacing the telescopic rods 1 is not necessary. The retraction and pull-out is effected by a corresponding displacement of the cover 9 in a respective direction for displacing the telescopic rods 1 in the channels 26.

The end element 21 is connected to the bending region 25 in a predetermined spaced relationship with respect to the corresponding telescopic sleeves 2. The angular position of the deformable end element 21 influences the position of the telescopic rods 1. The different positions of the telescopic rods 1 correspond to different degrees of deformation of the end element 21 which is supported at its opposite ends in brackets 29 (FIG. 11). The position of the telescopic rods 1 depend on the degree of stiffness of the deformed end element 21. Thus, the changing of the angular position or the degree of deformation of the end element 21 results in a desired displacement of the telescopic rods 1. This permits to eliminate the height controlling mechanism. Different degrees of deformation of the end element 21 are shown in FIGS. 12–15. The reference numeral 27 and 28 show the positions of telescopic rods 1 in the retracted (FIG. 12) and pull-out (FIG. 13) positions. Reference numerals 27a, 28a designate conditions of the coverings of the telescopic rods 1.

The present invention makes a substantial contribution to the advancement of health care. The present invention is based on an effective use of ecological resources. The present invention is based on a mechanical principle that contributes to economy of material and sets forth alternative possibilities of changing the conditions of the support surface without the use of external energy sources.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A mechanism for changing a horizontal length of a one-piece thigh support surface of seats and couches and formed as a one-piece part having a deformable bent region at a front end of a seat and a couch, the changing mechanism comprising:

two telescopic rods extending horizontally parallel to each other and in a spaced relationship with each other and forming a support for the thigh support surface, the telescopic rods having respective U-shaped regions, upper straight regions, and lower straight regions adjoining the respective U-shaped regions at lower portions of the U-shaped regions by a transversely extending rod, the U-shaped regions forming, together with respective lower straight regions, a support for supporting the deformable bent region of the thigh support surface;

two telescopic sleeves to which the two telescopic rods are relatively displaceable;

means for changing the horizontal length of the thigh support surface and having means for displacing the telescopic rods in a direction away from the telescopic sleeves, whereby a length of the thigh support surface changes, resulting in a change of the horizontal length of the thigh support surface which is caused by deformation of the bent region produced by sliding of the bent support region along the telescopic rods;

and two arcuate slide connection elements surrounding respective telescopic rods in an area of the U-shaped region thereof, fixedly secured thereto, and supporting the deformable bent region of the thigh support surface by circumferential surfaces thereof, the slide connection elements having a variable length to provide for sliding of the deformable bent region of the thigh support surface along the U-shaped regions of the telescopic rods.

2. A mechanism for changing a horizontal length of a one-piece thigh support surface of seats and couches and formed as a one-piece part having a deformable bent region at a front end of a seat and a couch, the changing mechanism comprising:

two telescopic rods extending horizontally parallel to each other and in a spaced relationship with each other and forming a support for the thigh support surface, the telescopic rods having respective U-shaped regions, upper straight regions, and lower straight regions adjoining the respective U-shaped regions at lower portions of the U-shaped regions by a transversely extending rod, the U-shaped regions forming, together with respective lower straight regions, a support for supporting the deformable bent region of the thigh support surface;

two telescopic sleeves to which the two telescopic rods are relatively displaceable;

means for changing the horizontal length of the thigh support surface and having means for displacing the telescopic rods in a direction away from the telescopic sleeves, whereby a length of the thigh support surface changes, resulting in a change of the horizontal length of the thigh support surface which is caused by deformation of the bent region produced by sliding of the bent support region along the telescopic rods;

and means for changing a position of the two telescopic sleeves in accordance with a displacement position of the two telescopic rods.

3. A mechanism as set forth in claim 2, wherein the changing position means comprises a lever mechanism.

* * * * *